United States Patent
Swasey et al.

(10) Patent No.: US 9,073,423 B2
(45) Date of Patent: Jul. 7, 2015

(54) STEERING AND DRIVE ASSEMBLY

(75) Inventors: Merin Swasey, North Logan, UT (US); Tyler Kirby, Logan, UT (US); Kelly Hoth, Smithfield, UT (US)

(73) Assignee: Boomerang Systems, Inc., Florham Park, NJ (US)

( * ) Notice: Subject to any disclaimer, the term of this patent is extended or adjusted under 35 U.S.C. 154(b) by 0 days.

(21) Appl. No.: 13/542,629

(22) Filed: Jul. 5, 2012

(65) Prior Publication Data

US 2013/0008734 A1    Jan. 10, 2013

Related U.S. Application Data

(60) Provisional application No. 61/505,698, filed on Jul. 8, 2011.

(51) Int. Cl.
*B60K 17/30* (2006.01)
*B60K 7/00* (2006.01)

(52) U.S. Cl.
CPC ............... *B60K 7/0007* (2013.01); *B60K 17/30* (2013.01); *B60K 2007/0061* (2013.01)

(58) Field of Classification Search
CPC ...................................................... B60K 17/30
USPC ................................................. 180/252, 253
See application file for complete search history.

(56) References Cited

U.S. PATENT DOCUMENTS

| | | | |
|---|---|---|---|
| 3,534,825 A | 10/1970 | Reffle | |
| 3,583,639 A | 6/1971 | Cornelius | |
| 3,912,037 A * | 10/1975 | Krieg | 180/168 |
| 4,078,630 A * | 3/1978 | Krieg | 180/168 |
| 4,461,367 A | 7/1984 | Eichinger et al. | |
| 4,463,821 A * | 8/1984 | Falamak | 180/168 |
| 4,513,839 A | 4/1985 | Nieminski et al. | |
| 4,529,052 A * | 7/1985 | Imai et al. | 180/6.48 |
| 4,683,973 A | 8/1987 | Honjo et al. | |
| 4,729,449 A * | 3/1988 | Holmquist | 180/168 |

(Continued)

FOREIGN PATENT DOCUMENTS

| | | | |
|---|---|---|---|
| JP | 562241770 A | 10/1987 |
| JP | H058738 A | 1/1993 |

(Continued)

OTHER PUBLICATIONS

International Search Report and Written Opinion for corresponding international application No. PCT/US2010/021284 mailed May 17, 2010.

(Continued)

*Primary Examiner* — Joseph Rocca
*Assistant Examiner* — Conan Duda
(74) *Attorney, Agent, or Firm* — Graham Curtin, P.A.

(57) ABSTRACT

A drive and steering unit for driving and steering a load support comprises, in one embodiment, a steering assembly including a steering gear attached to a wheel housing and engaged with the steering power system, the steering gear being rotatable about an axis in response to actuation of the steering assembly, a drive assembly connected to the steering gear, and a drive power system coupled to the drive assembly and movable with the steering gear. In an alternate embodiment, the steering assembly is connected to the wheel through a steering gear attached to a slewing ring that supports the drive assembly and is rotatable with the drive assembly.

23 Claims, 7 Drawing Sheets

(56) References Cited

U.S. PATENT DOCUMENTS

| | | | |
|---|---|---|---|
| 5,432,416 A * | 7/1995 | Tae-Sig | 318/568.12 |
| 5,609,220 A * | 3/1997 | Moriya et al. | 180/253 |
| 5,901,805 A * | 5/1999 | Murakami et al. | 180/168 |
| 6,408,230 B2 * | 6/2002 | Wada | 701/1 |
| 6,491,127 B1 | 12/2002 | Holmberg et al. | |
| 7,296,643 B2 * | 11/2007 | Philipson | 180/65.1 |
| 7,591,340 B2 | 9/2009 | Scharfenberg et al. | |
| 7,747,349 B2 | 6/2010 | Yeh et al. | |
| 2006/0289218 A1 | 12/2006 | Allen | |
| 2007/0065258 A1 | 3/2007 | Benedict et al. | |
| 2007/0150096 A1 | 6/2007 | Yeh et al. | |
| 2007/0289798 A1 * | 12/2007 | Kaufmann | 180/253 |
| 2008/0289309 A1 * | 11/2008 | Gust et al. | 56/11.9 |
| 2010/0181136 A1 * | 7/2010 | Swasey et al. | 180/253 |
| 2011/0048834 A1 * | 3/2011 | Roeder | 180/252 |
| 2011/0168474 A1 * | 7/2011 | Checketts et al. | 180/237 |
| 2012/0006609 A1 * | 1/2012 | Doan et al. | 180/218 |

FOREIGN PATENT DOCUMENTS

| | | |
|---|---|---|
| JP | 2002061736 | 2/2002 |
| JP | 2003156129 | 5/2003 |
| JP | 2003194157 | 7/2003 |
| JP | 2003321102 | 11/2003 |
| WO | 03062007 A1 | 7/2003 |
| WO | 2010083473 | 7/2010 |

OTHER PUBLICATIONS

Supplementary European Search Report and Examiner's Opinion mailed May 13, 2015 in corresponding European Patent Application No. 12811628.2.

* cited by examiner

STEERING AND DRIVE ASSEMBLY

CROSS-REFERENCE TO RELATED APPLICATIONS

This application claims the benefit under 35 U.S.C. §119 (e) from U.S. Application 61/505,698, filed Jul. 8, 2011. This application is also related to U.S. application Ser. No. 13/004,552 filed Jan. 11, 2011, which claims the benefit of U.S. Application 61/294,932, filed Jan. 14, 2010. This application is also related to U.S. Application 61/145,543, filed Jan. 17, 2009, and U.S. Application 61/248,448, filed Oct. 3, 2009, and U.S. Application 61/258,006, filed Nov. 4, 2009. The contents of each of the above applications are incorporated herein by reference in their entirety.

FIELD OF THE INVENTION

The present invention relates to a wheel drive and steering unit for, in one embodiment, a load support such as an automatic guided vehicle (AGV) and other semi-automatic or manually controlled vehicles.

BACKGROUND

Conventional AGVs rely upon gear units that house separate drive and steering components that are adjacent to a load carried by a vehicle. For example, conventional AGVs employ two turnable and two non-turnable wheels, much like a forklift, where the drive and steering mechanisms are adjacent to the load. That design simplifies the mechanical components of the system, but limits the amount of the load a vehicle can carry and the maneuverability of the vehicle. The load is limited because the placement of the drive and steering components adjacent to the load increases the top-heaviness of the vehicle. Maneuverability is constrained because only two wheels are capable of turning.

In addition, existing drive and steering units are relatively delicate in construction, large in design, and provide minimal power for steering, drive, and load bearing functions relative to the overall size of the unit.

SUMMARY

A drive and steering unit, incorporated in one embodiment in an AGV for example, is provided for driving and steering a load support, such as a tray or a storage locker for example, and includes a steering assembly for steering a wheel and a drive assembly for driving the wheel. In one embodiment, the steering assembly includes a steering gear attached to a wheel housing that houses the wheel, the steering gear being engaged with the steering power system and being rotatable about an axis in response to actuation of the steering assembly. The drive assembly is connected to the steering gear and is coupled to a drive power system for driving the wheel, the drive assembly being movable with the steering gear. In an alternate embodiment, the steering assembly is connected to the wheel through a steering gear attached to a slewing ring that supports the drive assembly and is rotatable with the drive assembly.

BRIEF DESCRIPTION OF THE DRAWINGS

The accompanying drawings, which are incorporated in and form a part of this specification, illustrate certain embodiments of an omnidirectional drive and steering unit and together with the description, serve to explain certain aspects of the principles of this application.

DETAILED DESCRIPTION OF THE PREFERRED EMBODIMENTS

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 1:
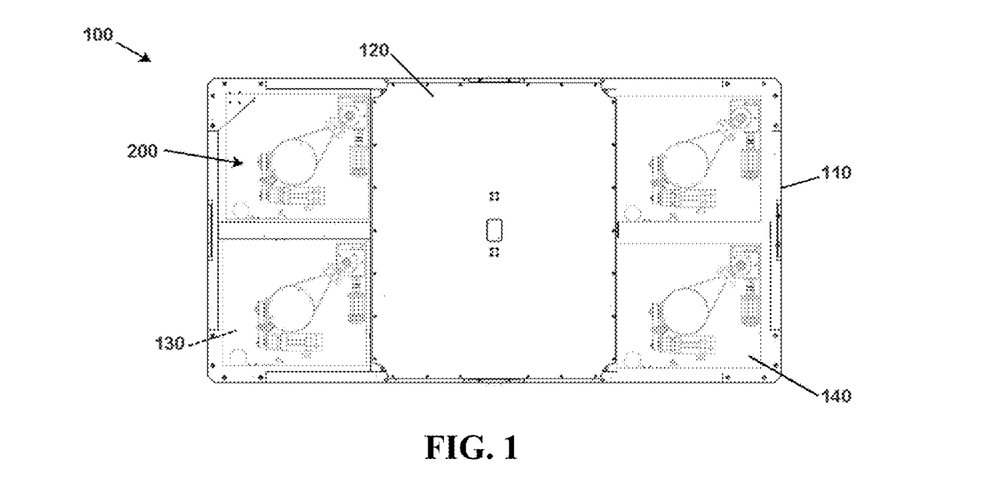
FIG. 1 is a top view of one embodiment of an AGV including a steering and drive unit of the present disclosure.
Figure 2:
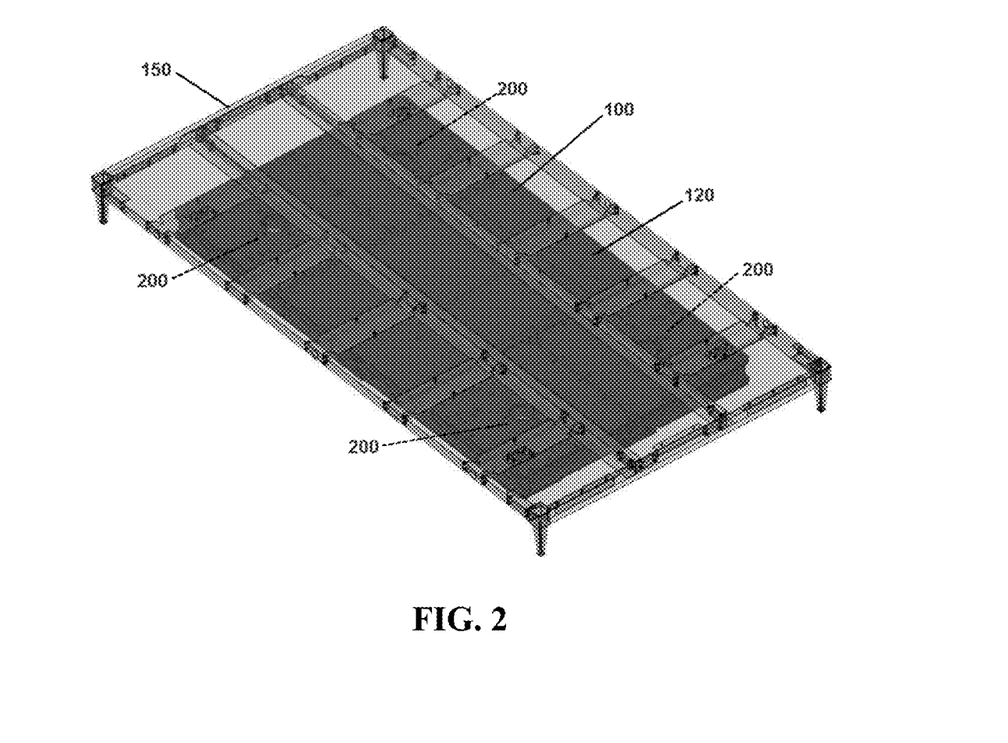
FIG. 2 is a perspective view of an AGV carrying a load.

FIG. 1 is a top view of one embodiment of an AGV 100 including a frame 110, a support surface or platform 120 that defines a support plane and a plurality of drive and steering units 200 secured to the bottom 130 of the frame 110. The support platform 120 is partially cut away for purposes of clarity to show the drive and steering units 200, it being understood that the support platform 120 would preferably extend to the borders of the frame 110 and would completely enclose the drive and steering units 200 with only the drive wheel being visible from the bottom or underside of the AGV 100. The support platform 120 comprises a load support on which a load 150 (FIG. 2) is placed for transport by the AGV 100. Such load could, for example, comprise a tray upon which a vehicle or the like is driven and/or stored as described in U.S. Application 61/258,006 ("the '006 application"). Alternatively, the load could be a storage locker as also described in the '006 application. Other non-limiting variations of loads are contemplated.

The embodiment of the AGV 100 shown in FIG. 1, for example, is generally rectangular in construction with drive and steering units 200 positioned at each corner 140. However, the configuration of the AGV 100 need not be so limited. The AGV 100 could, for example, have a footprint that is square, oval, circular or the like (not shown). The AGV 100 could be any shape or configuration without departing from its lift and transport requirements. In addition, while four drive and steering units 200 are shown, it will be understood that other than four drive and steering units 200 may be utilized, at various locations relative to the frame 110, if desired by the needs of the user and taking into account the load demands and configurations. Such drive and steering units 200 may be operated simultaneously or independently of each other. However, it will be appreciated that from a manufacturing and operational perspective, the use of four identical drive and steering units, if desired, is preferable in order to take advantage of efficiencies with regards to controls, electrical, mechanical, wiring and other components.

FIGS. 3-7 illustrate one embodiment of a drive and steering unit 200 that is incorporated into an AGV 100 as shown, for example, in FIG. 1, for engaging a wheel housing 300 having a wheel 310 therein. The wheel housing 300 is fixed to the bottom 130 of the frame 110, which forms a support 130 for the wheel housing 300 and which defines a support plane. Mounting the wheel housing 300 above the plane of the support 130 provides easier access to the drive and steering units 200 for purposes of service and maintenance. The wheel housing 300 is rotatable relative to the support 130 by a bearing 160 enclosed within a bearing housing 170 that is connected between the wheel housing 300 and the support 130. The wheel housing 300 has a first axis 302 that is aligned with a drive shaft 330 of the wheel 310 housed therein, and a second axis 304 that is normal to the first axis 302 along a center of the wheel 310.

The drive and steering unit 200 further comprises a steering assembly 400 for steering the wheel 310 and a drive assembly 500 for driving the wheel 310, each of the steering assembly 400 and the drive assembly 500 being capable of operating simultaneously or independent of each other. The steering assembly 400 includes a steering gear 410 and a steering power system 420 coupled to the steering gear 410 for controlling and driving the steering gear 410. The steering power system 420 further comprises a steering motor 430 that drives a steering motor pulley 440 through a gearbox 450. The steering gear 410 is attached to the wheel housing 300 and has a central axis aligned with the second axis 304 of the wheel housing 300, such that the wheel housing 300 is rotatable with the steering gear 410 about the second axis 304 and is thus steered by the movement of the steering gear 410. More specifically, the steering motor 430 drives the steering motor pulley 440 that in turn drives the steering gear 410 through the coupling of the steering gear 410 and the steering motor pulley 440 by a steering belt 415. The steering power system 420 is spaced from the wheel housing 300 and is coupled thereto by the steering belt 415, which belt 415 is maintained in proper engagement by a tensioner 417 attached to the gearbox 450. While a belt 415 is described, it will be appreciated that other implements may be used such as a chain, for example.

Figure 3:
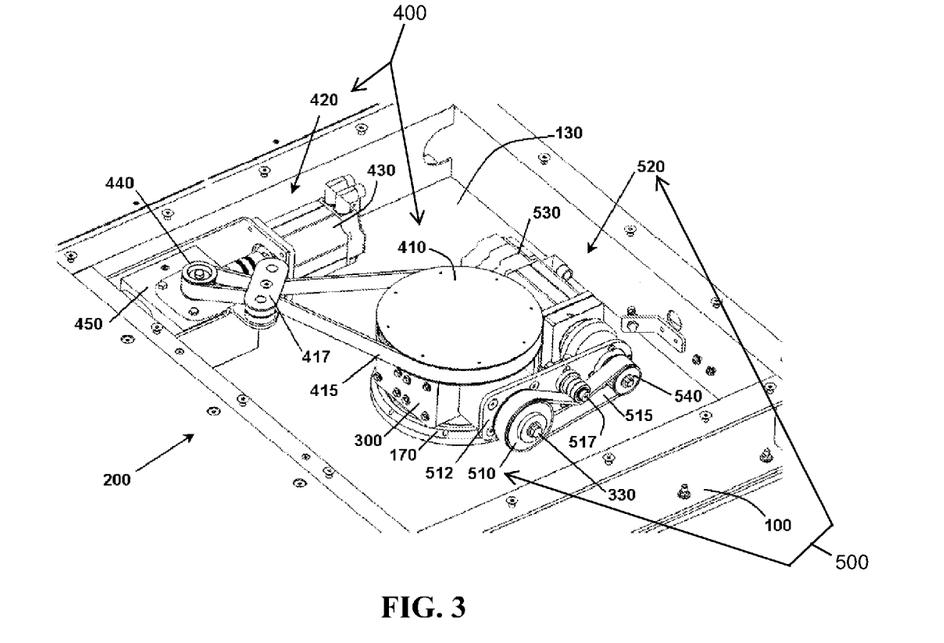
FIG. 3 is a perspective view of one embodiment of a steering and drive unit.
Figure 4:
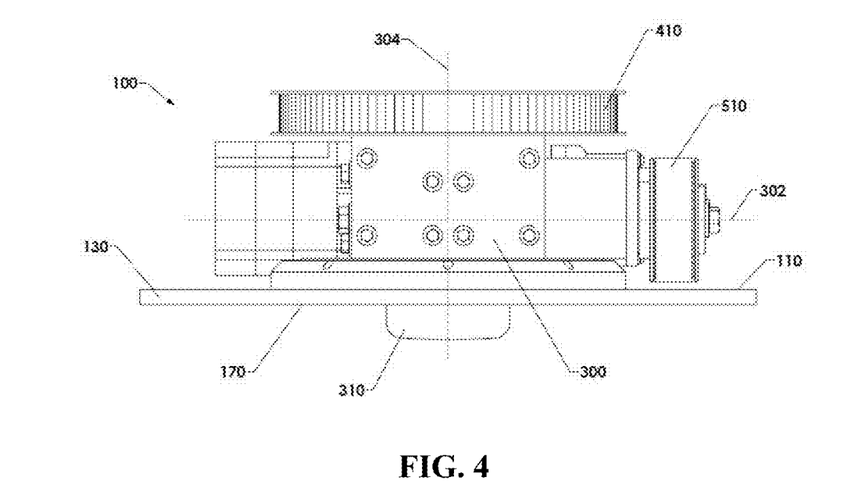
FIG. 4 illustrates one view of one part of a steering assembly.
Figure 5:
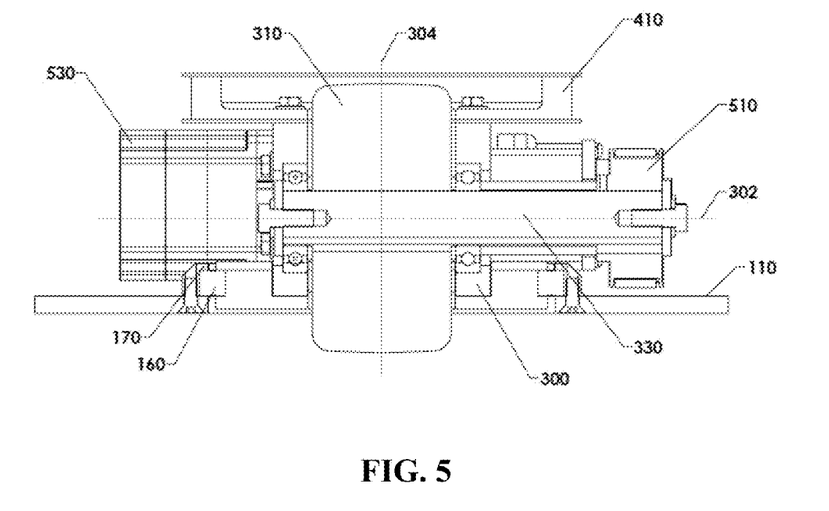
FIG. 5 is a cross section taken through the part of the steering assembly of FIG. 4.
Figure 6:
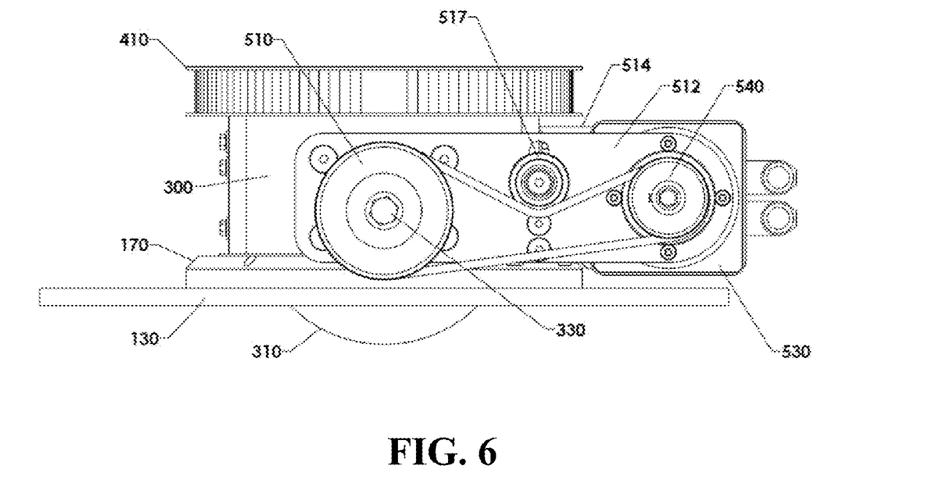
FIG. 6 illustrates one view of a portion of a drive assembly.

The drive assembly 500 is coupled to the wheel housing 300 for driving the drive shaft 330 of the wheel 310. The drive assembly 500 includes a driving pulley 510 and a drive power system 520 coupled to the driving pulley 510 by a connector plate 512 for controlling and driving the drive shaft 330 of the wheel 310 through the driving pulley 510. The drive power system 520 further comprises a driving motor 530 that drives a driving motor pulley 540 coming directly off the driving motor 530. The driving pulley 510 is attached to the drive shaft 330 and is coaxial therewith, such that the drive shaft 330 is rotatable with the driving pulley 510 and is thus driven thereby. More specifically, the driving motor 530 drives the driving motor pulley 540 that in turn drives the driving pulley 510 through the coupling of the driving pulley 510 and the driving motor pulley 540 by a driving belt 515, which belt 515 is maintained in proper engagement by a tensioner 517 attached to the connector plate 512. While a belt 515 is described, it will be appreciated that other implements may be used such as a chain, for example.

Figure 7:
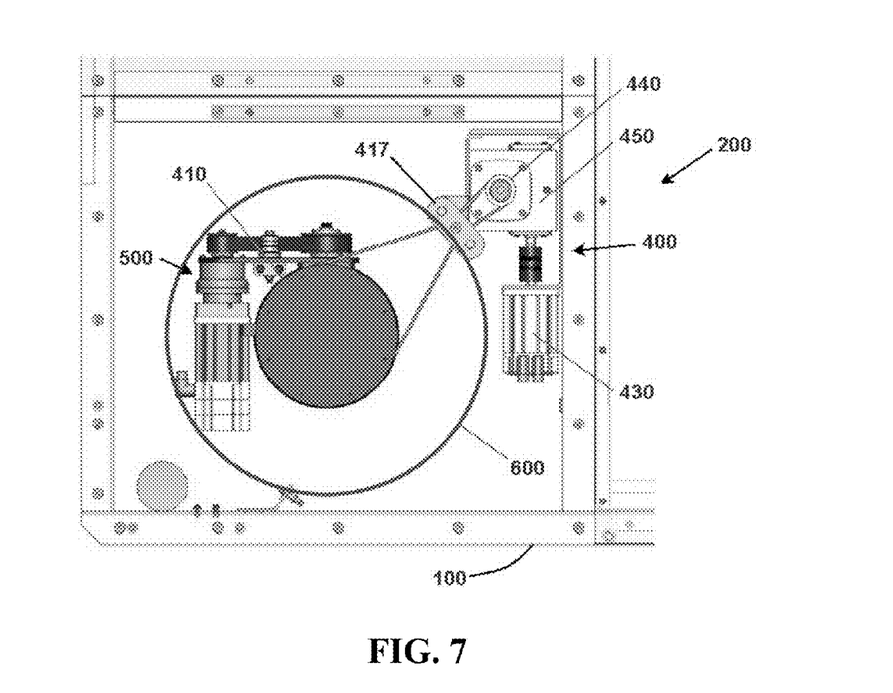
FIG. 7 illustrates a rotation profile of the steering and drive unit.
Figure 8:
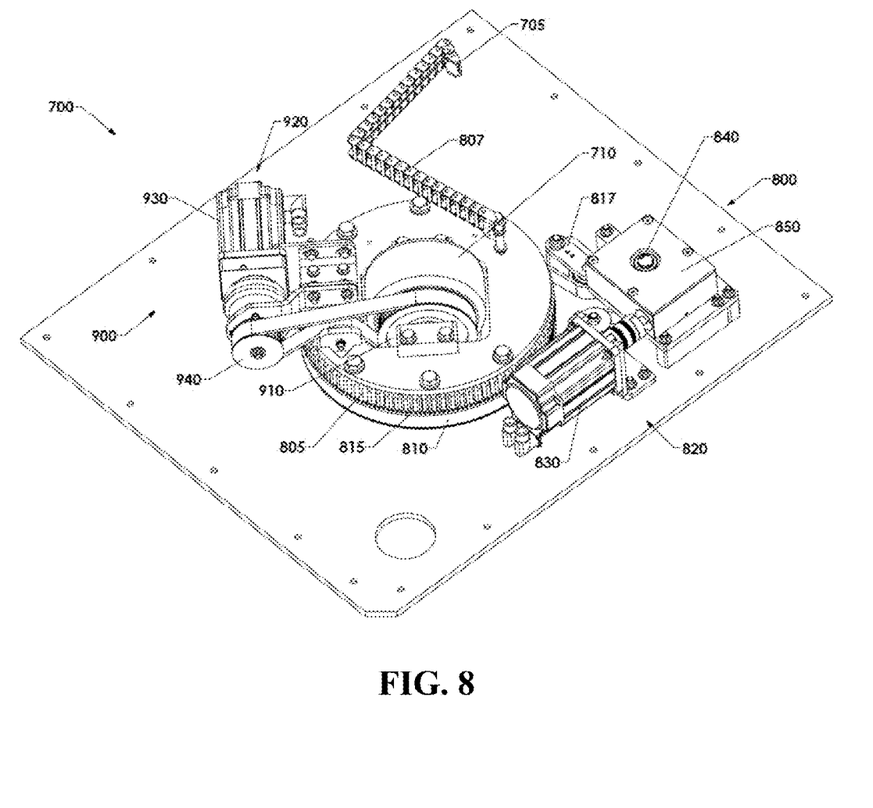
FIG. 8 illustrates an alternate embodiment of a steering and drive unit of the present disclosure.
Figure 9:
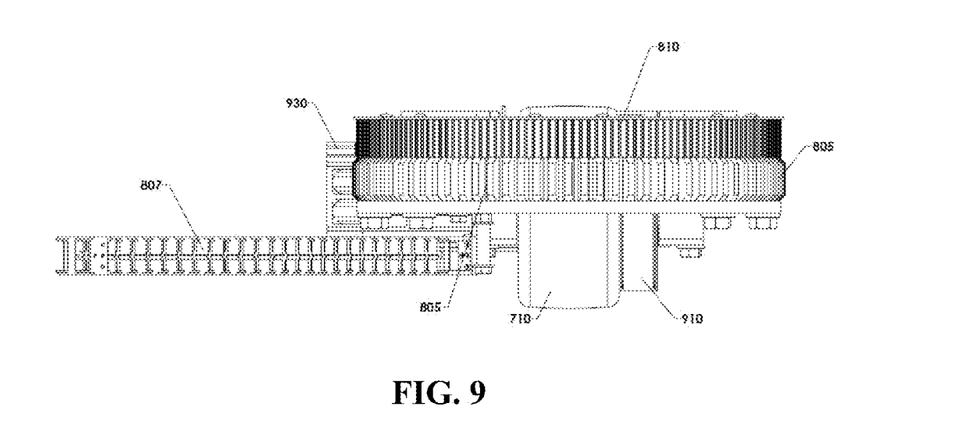
FIG. 9 illustrates one view of one part of a steering assembly.
Figure 10:
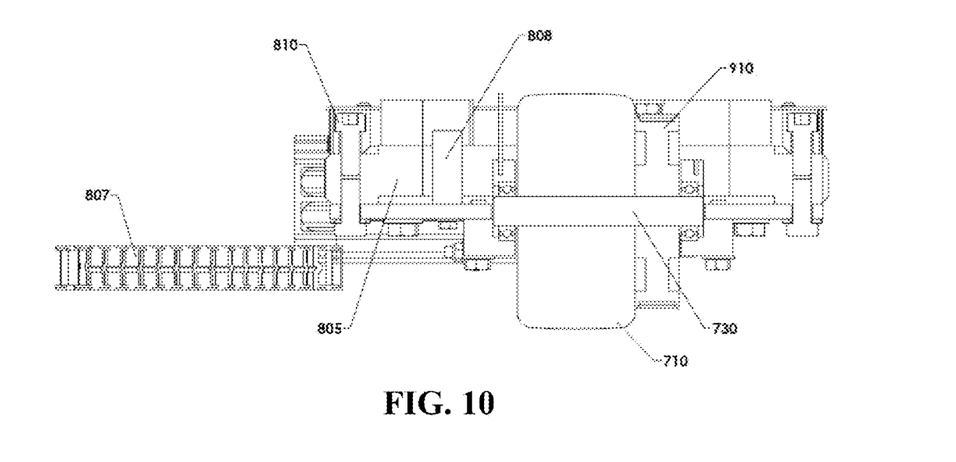
FIG. 10 is a cross section taken through the part of the steering assembly of FIG. 9.

In the illustrated embodiment, the drive power system 520 is not spaced from the wheel housing 300 but is instead attached or mounted thereto by the connector plate 512 and an additional connection 514. The drive power system 520 is thus rotatable with the wheel housing 300 preferably along a 360° degree profile 600 through which the drive power system 520 travels, which provides a turning range for steering and control of up to or greater than 360° degrees, such as 370° degrees for example, thereby allowing greater and more efficient steering control and the ability to perform more complex tasks. The steering power system 420 is thus spaced from the wheel housing 300 a sufficient distance to accommodate the travel profile of the drive power system 520.

Thus, there is described, in one embodiment, an AGV 100 comprising a load support 120, a plurality of drive and steering units 200 for driving and steering the load support 120, each drive and steering unit 200 comprising a steering assembly 400 including a steering gear 410 attached to a wheel housing 300 and engaged with the steering power system 420, the steering gear 410 being rotatable about an axis 304 in response to actuation of the steering assembly 400, a drive assembly 500 connected to the steering gear 410, and a drive power system 520 coupled to the wheel housing 300 and movable with the steering gear. The drive and steering units 200 are each independently capable of up to or greater than 360° degree movement, which results in a highly controllable, agile and responsive movement and enables a user to easily maneuver a load 150 around obstacles (not shown) and locate the AGV 100 within tight storage locations (not shown). Furthermore, the wheel housing 300 is mounted above the support plane, which enables easier access to the drive and steering units 200 for purposes of service and maintenance.

FIGS. 8 through 11 illustrate an alternate embodiment of a drive and steering unit 700 that is incorporated into an AGV as shown, for example, in FIG. 1, for engaging a wheel 710, and that is similar in certain respects to the drive and steering unit disclosed in the '066 application incorporated herein by reference. The drive and steering unit 700 further comprises a steering assembly 800 for steering the wheel 710 and a drive assembly 900 for driving the wheel 710, each of the steering assembly 800 and the drive assembly 900 being capable of operating simultaneously or independent of each other. The steering assembly 800 includes a steering gear 810 and a steering power system 820 coupled to the steering gear 810 for controlling and driving the steering gear 810. The steering power system 820 further comprises a steering motor 830 that drives a steering motor pulley 840 through a gearbox 850. The steering gear 810 is attached to a slewing ring 805 that supports both a drive shaft 730 of the wheel 710 and the drive assembly 900, the slewing ring 805 being rotatable with the steering gear 810 and being steered by the movement of the steering gear 810. More specifically, the steering motor 830 drives the steering motor pulley 840 that in turn drives the steering gear 810 through the coupling of the steering gear 810 and the steering motor pulley 840 by a steering belt 815. The steering power system 820 is spaced from the wheel 710, steering gear 810 and slewing ring 805 and is coupled thereto by the steering belt 815, which belt 815 is maintained in proper engagement by a tensioner 817 attached to the gearbox 850. While a belt 815 is described, it will be appreciated that other implements may be used such as a chain, for example.

Figure 11:
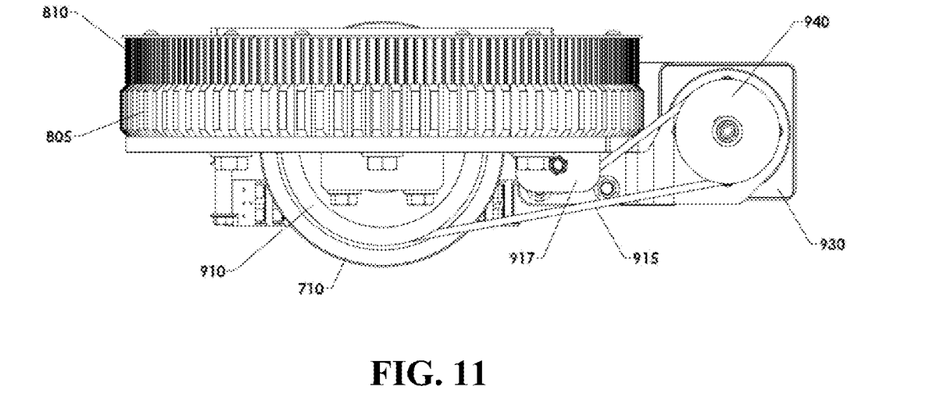
FIG. 11 illustrates one view of a portion of a drive assembly.

The drive assembly 900 is coupled to the wheel 710 and slewing ring 805 for driving the drive shaft 730 of the wheel 710. The drive assembly 900 includes a driving pulley 910 and a drive power system 920 coupled to the driving pulley 910 for controlling and driving the drive shaft 730 (FIG. 10) of the wheel 710 through the driving pulley 910. The drive power system 920 further comprises a driving motor 930 that drives a driving motor pulley 940 coming directly off the driving motor 930. The driving pulley 910 is attached to the drive shaft 730 and is coaxial therewith, such that the drive shaft 730 is rotatable with the driving pulley 910 and is thus driven thereby. More specifically, the driving motor 930 drives the driving motor pulley 940 that in turn drives the driving pulley 910 through the coupling of the driving pulley 910 and the driving motor pulley 940 by a driving belt 915, which belt 915 is maintained in proper engagement by a tensioner 917 (FIG. 11). While a belt 915 is described, it will be appreciated that other implements may be used such as a chain, for example.

In the illustrated embodiment, the drive power system 920 is attached or mounted to the slewing ring 805, which is attached to the steering gear 810. Thus, the drive power system 920 is rotatable with the steering gear 810 and slewing ring 805 along a profile that is less than 360° degrees, including, but not limited to, 210° degrees, for example. Other travel profile dimensions are possible. Movement of the slewing ring 805 is also limited by a cable 807 spanning the slewing ring 805 and the support 705 and a hard stop block 808 (FIG. 10) attached to the slewing ring 805. Thus, the slewing ring 805 supports both the drive assembly 900 and the drive power system 920 and is able to dynamically and robustly steer or rotate the drive wheel 710 and carry the drive power system 920 under an appreciable load. The robust load-bearing contribution of the slewing ring 805 allows the use of an increased diameter drive wheel 710, if desired, with a preferred wheel diameter of approximately eight inches, for example. Other dimensions are possible.

During operation of the steering and drive unit 700, forward and backward movement is controlled by the drive power system 920 acting on the driving pulley 910 through the driving belt 915. Rotation of the wheel 710, for steering an AGV for example, is executed by rotating the steering gear 810, which in turn rotates the slewing ring 805 that acts on the drive shaft 730. As noted above, the forward/backward motion and steering motion can be affected independently or simultaneously.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A drive and steering unit comprising:
    a) a wheel housing having a first axis that is aligned with a drive shaft of a wheel housed therein, and a second axis that is normal to the first axis along a center of the wheel;
    b) a steering assembly for steering the wheel and having a steering gear and a steering power system coupled to the steering gear for controlling and driving the steering gear;
    c) the steering gear being attached to the wheel housing, having a central axis aligned with the second axis, and being rotatable with the wheel housing about the second axis; and
    d) a drive assembly coupled to the wheel housing for driving the wheel, and a drive power system coupled to the drive assembly and movable with the wheel housing;
    wherein the steering gear is a steering pulley attached to the wheel housing; and
    wherein the steering power system is spaced from the wheel housing and coupled to the steering pulley by a steering belt;
    wherein the wheel housing is fixed to a support at a point of fixation which defines a support plane and wherein the entire wheel housing and the entire steering power system are mounted above the support plane.

2. The drive and steering unit of claim 1, wherein the steering power system further comprises a steering motor pulley, the steering belt coupling the steering pulley to the steering motor pulley.

3. The drive and steering unit of claim 1, wherein the drive assembly is mounted to the wheel housing and rotatable therewith.

4. The drive and steering unit of claim 3, wherein the drive power system is attached to the wheel housing and coupled to the drive shaft by a driving belt.

5. The drive and steering unit of claim 4, wherein the drive power system further comprises a drive motor pulley, the driving belt coupling the drive motor pulley to the drive shaft.

6. The drive and steering unit of claim 5, further comprising a drive shaft pulley secured to the drive shaft that is coupled to the driving belt.

7. The drive and steering unit of claim 1, wherein the wheel housing is capable of up to or greater than 360° degrees of movement.

8. The drive and steering unit of claim 1, wherein the wheel housing is rotatable relative to the support by a bearing connected between the wheel housing and the support.

9. The drive and steering unit of claim 8, wherein the drive assembly is connected to the bearing.

10. The drive and steering unit of claim 1, wherein the steering assembly and the drive assembly are each adapted to operate independently or simultaneously.

11. An automated guided vehicle (AGV) comprising:
    a) a load support; and
    b) a plurality of drive and steering units for driving and steering the load support;
    c) each drive and steering unit comprising a steering assembly including a steering gear attached to a wheel housing and engaged with a steering power system, the steering gear being rotatable about an axis in response to actuation of the steering assembly, a drive assembly connected to the steering gear, and a drive power system coupled to the wheel housing and movable with the steering gear;
    wherein the steering gear is a steering pulley attached to the wheel housing; and
    wherein the steering power system is spaced from the wheel housing and coupled to the steering pulley by a steering belt;
    wherein the wheel housing is fixed to a support at a point of fixation which defines a support plane and wherein the entire wheel housing and the entire steering power system are mounted above the support plane.

12. The automated guided vehicle (AGV) of claim 11, wherein the steering power system further comprises a steering motor pulley, the steering belt coupling the steering pulley to the steering motor pulley.

13. The automated guided vehicle (AGV) of claim 11, wherein the drive assembly is mounted to the wheel housing and rotatable therewith.

14. The automated guided vehicle (AGV) of claim 13, wherein the drive power system is attached to the wheel housing and coupled thereto by a driving belt.

15. The automated guided vehicle (AGV) of claim 11, wherein the wheel housing is capable of up to or greater than 360° degrees of movement.

16. The automated guided vehicle (AGV) of claim 11, wherein the wheel housing is rotatable relative to the support by a bearing connected between the wheel housing and the support.

17. The automated guided vehicle (AGV) of claim 16, wherein the drive assembly is connected to the bearing.

18. The automated guided vehicle (AGV) of claim 11, wherein the steering assembly and the drive assembly are each adapted to operate independently or simultaneously.

19. The automated guided vehicle (ACV) of claim 11, further comprising four drive and steering units positioned along adjacent corners of the load support, the steering assemblies being fixed adjacent a periphery of the load support.

20. A drive and steering unit comprising:
  a) a steering assembly for steering a wheel and having a steering gear and a steering power system coupled to the steering gear for controlling and driving the steering gear;
  b) a slewing ring attached to the steering gear for rotating the wheel; and
  c) a drive assembly coupled to the slewing ring for driving the wheel, and a drive power system coupled to the drive assembly and movable with the slewing ring and the wheel;
  wherein the steering power system is spaced from the slewing ring by a steering belt;
  wherein the slewing ring is fixed to a support at a point of fixation which defines a support plane and wherein the entire slewing ring and the entire steering power system are mounted above the support plane.

21. The drive and steering unit of claim 20, wherein the steering power system further comprises a steering motor pulley, the steering belt coupling a steering pulley to the steering motor pulley.

22. The drive and steering unit of claim 20, wherein the drive assembly is mounted to the stewing ring and rotatable therewith.

23. The drive and steering unit of claim 22, wherein the drive power system is attached to the stewing ring and coupled to the wheel by a driving belt.

* * * * *